United States Patent [19]
Yoshida et al.

[11] Patent Number: 5,938,208
[45] Date of Patent: *Aug. 17, 1999

[54] SEPARATE PLATE PLACED BETWEEN ADJACENT VALVE BODIES IN A CONTROL VALVE UNIT OF AN AUTOMATIC TRANSMISSION

[75] Inventors: Yukio Yoshida; Hironobu Fukunishi; Takeshi Naitou; Koichi Fusa; Yoshitaka Abe, all of Toyonaka, Japan

[73] Assignee: Kokusan Parts Industry Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/715,357

[22] Filed: Sep. 10, 1996

Related U.S. Application Data

[62] Division of application No. 08/366,910, Dec. 30, 1994, Pat. No. 5,582,415.

[51] Int. Cl.⁶ .................................................... F16J 15/12
[52] U.S. Cl. ............................................................ 277/592
[58] Field of Search ...................................... 277/592, 650

[56] References Cited

U.S. PATENT DOCUMENTS

| | | |
|---|---|---|
| 3,756,279 | 9/1973 | Widmaier . |
| 4,600,201 | 7/1986 | Lonne et al. . |
| 4,635,948 | 1/1987 | Zerfass et al. . |
| 4,635,949 | 1/1987 | Lucas et al. . |
| 4,822,062 | 4/1989 | Gallo et al. . |
| 4,968,045 | 11/1990 | Abe et al. . |
| 5,150,910 | 9/1992 | Udagawa . |
| 5,255,926 | 10/1993 | Udagawa . |
| 5,354,074 | 10/1994 | Jinno . |
| 5,393,076 | 2/1995 | Hagiwara et al. . |

FOREIGN PATENT DOCUMENTS 2169362  7/1986  United Kingdom .

*Primary Examiner*—Anthony Knight
*Assistant Examiner*—John L. Beres
*Attorney, Agent, or Firm*—Armstrong, Westerman, Hattori, McLeland & Naughton

[57] ABSTRACT

An inexpensive metal gasket with high sealing performance having a multiple-plate or single-plate structure to be placed between the cylinder block and the cylinder head, said metal gasket having on one side or both sides of the beaded plate or the stiffening plate the coating layer formed by pattern printing in conformity with the bead and the stopper. The coating layer includes at least two types of coatings located at different areas on the gasket.

7 Claims, 17 Drawing Sheets

5,938,208

1

SEPARATE PLATE PLACED BETWEEN ADJACENT VALVE BODIES IN A CONTROL VALVE UNIT OF AN AUTOMATIC TRANSMISSION

This is a divisional of application Ser. No. 08/366,910 filed Dec. 30, 1994; now U.S. Pat. No. 5,582,415.

BACKGROUND OF THE INVENTION

1. Field of the Invention

The present invention relates to a metal gasket having a coating layer formed thereon.

2. Description of the Related Art

Metal gaskets are generally used as a means to provide a seal between a cylinder head and a cylinder block of an engine. They are either of single-plate structure composed of a beaded plate alone or of multiple-plate structure composed of a beaded plate and a multiplicity of laminated stiffening plates. Some of them in practical use have a coating layer formed on the surface of the beaded plate or stiffening plate for providing an improved seal between the cylinder head and the cylinder block.

The coating layer is formed from NBR, fluororubber, or the like by spraying or spreading. Coating in this manner involves difficulties in using more than one kind of coating material at one time or leaving some parts uncoated. Therefore, it is a common practice to form the coating layer from a single material on the entire surface of the beaded plate or stiffening plate.

When installed between the cylinder head and cylinder block, the metal gasket also seals the water jackets formed outside the combustion chambers. This means that some part of the coating layer formed on the gasket is exposed to coolant at all times and hence is subject to peeling. Peeled fragments of the coating layer circulate together with coolant, clogging the thermostat and radiator tubes and eventually reducing engine performance. A means in practical use to overcome this disadvantage is to mechanically remove the part exposed to coolant passage prior to installation.

If the coating layer exposed to coolant passages is to be partially removed after the coating layer has been formed on the entire surface of the beaded plate and stiffening plate, the production of metal gaskets would require complex steps and take a long time. Moreover, the partial removal of the coating layer results in a waste of the coating material, which leads to a high production cost.

The conventional metal gasket in which the entire surface of the beaded plate and stiffening plate are coated with a single material suffers the disadvantage of being incapable of providing optimal sealing whether it is used near the combustion chamber to seal high-temperature exhaust gas and coolant or whether it is used near the oil passage to seal coolant and lubricant.

SUMMARY OF THE INVENTION

It is an object of the present invention to provide a metal gasket which costs less and yet provides a better seal than the conventional one.

The present invention is embodied in a metal gasket of multiple-plate or single-plate structure to be placed between two members, wherein said metal gasket has a coating layer formed thereon by pattern printing.

Other preferred embodiments of the present invention include a metal gasket in which the coating layer is formed such that its property varies in conformity with the part to be sealed; a metal gasket in which the coating layer is formed such that its material varies in conformity with the part to be sealed; a metal gasket in which the coating layer is formed such that its thickness varies in conformity with the part to be sealed; a metal gasket in which the coating layer is formed such that its thickness decreases stepwise or continuously in approaching the part at which the two members are bolted together; a metal gasket in which the coating layer is formed such that its thickness is greater at the part experiencing a high surface pressure than at the other parts; a metal gasket in which the coating layer is formed such that its width varies in conformity with the part to be sealed; and a metal gasket in which the coating layer functions as a spacer to keep constant the gap between the two members.

DESCRIPTION OF THE PREFERRED EMBODIMENTS

The metal gasket of the present invention has a multiple-plate or single-plate structure and has a coating layer formed thereon by pattern printing. It is placed between two members so as to provide a seal. The coating layer is confined to the part where sealing is necessary. This is accomplished by the use of pattern printing. Pattern printing permits the coating layer to be formed. easily, regardless of the pattern.

In a first embodiment, the coating layer is formed such that its property varies in conformity with the part to be sealed. This provides the metal gasket with better sealing performance and durability.

In another embodiment, the coating layer is formed such that its material varies in conformity with the part to be sealed. Selection of the material depends on heat resistance, wear resistance, etc. which are required at the specific sealing part. This provides the metal gasket with better sealing performance and durability.

In another embodiment, the coating layer is formed such that its thickness varies in conformity with the part to be sealed. The variation of thickness leads to a variation of surface pressure, which provides improved sealing performance.

In another embodiment, the coating layer is formed such that its thickness decreases stepwise or continuously in approaching the part at which the two members are bolted together. The decreasing thickness ensures uniform surface pressure, which provides improved sealing performance.

In another embodiment, the coating layer is formed such that its thickness is greater at the part experiencing a high surface pressure than at the other parts. This greatly improves the sealing performance at the specific part.

In another embodiment, the coating layer is formed such that its width varies in conformity with the part to be sealed. The result is that the surface pressure increases or decreases as the coating layer decreases or increases in width. This is equivalent to varying the thickness of the coating layer to adjust the surface pressure of the metal gasket to provide an improvement in sealing performance.

In another embodiment, the coating layer functions as a spacer to keep constant the gap between the two members. This effectively prevents the anomalous deformation of the bead when the metal gasket is placed between the cylinder head and block of an engine.

The present invention will be described with reference to the following examples which are illustrated in the accompanying drawings.

EXAMPLE 1

Figure 1:
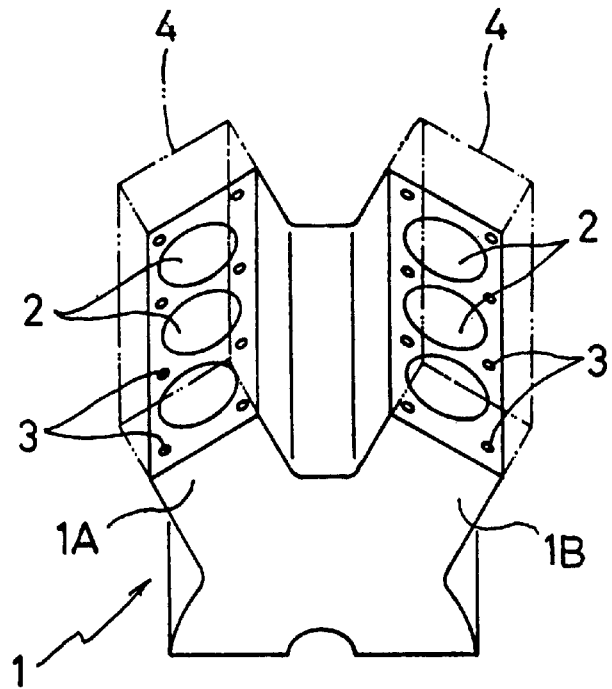
FIG. 1 is a perspective view of a cylinder block.
Figure 2:
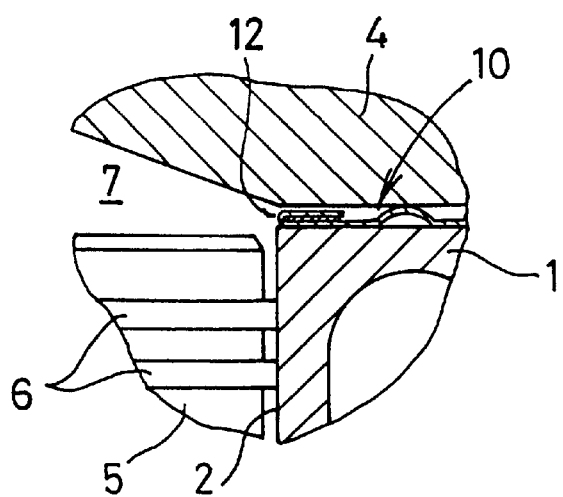
FIG. 2 is a vertical sectional view of portion of the cylinder block near the combustion chamber.
Figure 3:
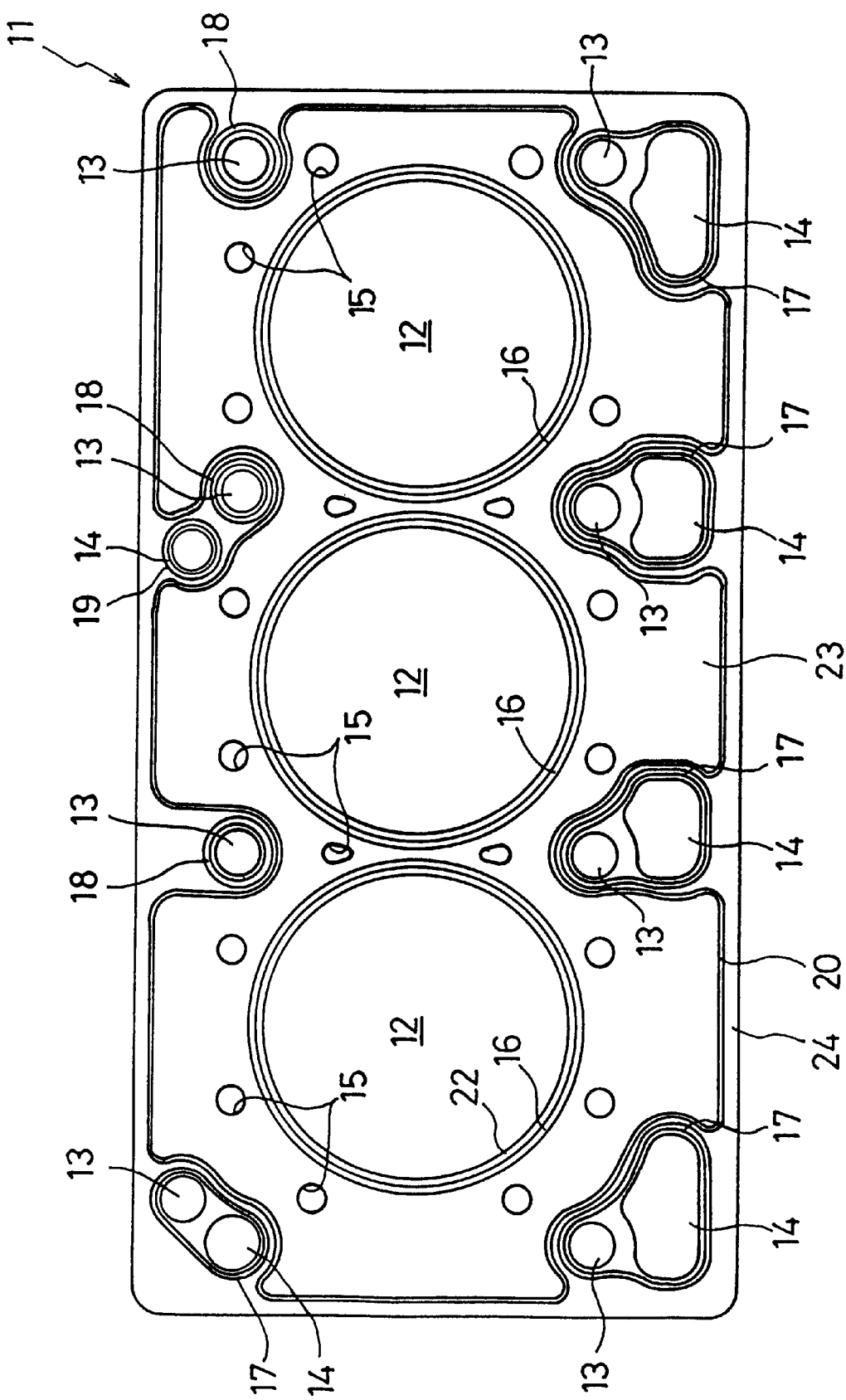
FIG. 3 is a plan view of the beaded plate.

This example demonstrates the metal gasket of the present invention which is placed between the cylinder head and block of a V-6 engine, as shown in FIGS. 1 and 2.

The V-6 engine has a cylinder block 1 which is divided into the right and left banks 1A, 1B, each having three cylinder holes 2. At the top of respective banks 1A, 1B, there are provided eight bolt holes 3. To the top of respective banks 1A, 1B are fixed a cylinder head 4 by bolts (not shown), respectively. Between the respective cylinder heads 4 and the respective banks 1A, 1B are placed a metal gasket 10 which prevents gas and liquid from leaking through the gap between the cylinder head 4 and the cylinder block 1. The cylinder hole 2 accommodates the piston 5 provided with several piston rings 6 which permit it to slide while keeping a gastight seal. At the top of the cylinder hole 2 (or above the piston 5) is formed the combustion chamber 7. Incidentally, the banks 1A, 1B and the cylinder head 4 are provided with passages for lubricant and coolant (which are not shown in FIG. 1).

The metal gaskets 10 for the right and left banks are basically of the same structure. The following is about the one for the left bank.

As shown in FIGS. 3 to 6, the metal gasket 10 has a single-plate structure and is composed of a virtually flat beaded plate 11 which has a coating layer 30 formed on the surface thereof.

The beaded plate 11 is made of stainless steel, such as precipitation hardened high-silicon duplex stainless steel, general-purpose SUS301, and precipitation hardened stainless steel (SUS630and SUS631).

The beaded plate 11 has three openings 12 for the cylinder holes 2 and 13 openings for the bolt holes 3. It also has six openings 14 and a plurality of openings 15 for lubricant passages and coolant passages, respectively. The number and arrangement of the lubricant holes 14 and coolant holes 15 will vary according to the number and arrangement of the lubricant passages and coolant passages in the engine.

The beaded plate 11 also has beads as follows:

Three beads 16 (for the combustion chambers), each surrounding the opening 12.

Five beads 17 (for the bolt holes and lubricant passages), each surrounding the adjoining bolt hole 13 and lubricant passage 14.

Thee beads 18 each surrounding the bolt hole 13.

One bead 19 surrounding the lubricant passage 14 alone.

One bead 20 surrounding a plurality of coolant passages 15 and three beads 16 (for the combustion chambers).

The opening 12 in the beaded plate 11 has a flat rim 21 along its periphery inside the bead 16. The flat rim 21 has its edge folded back, so that a stopper 22 is formed thereon. The beaded plate 11 has an inner flat part 23 which is surrounded by the bead 16 and the bead 20. Outside the beads 17–20 is formed an outer flat part 24.

The bead 16 is convex toward the cylinder head 4, and the beads 17–20 are of stepped structure. Upon installation, the flat rim 21 and the inner flat part 23 rests on the cylinder block 1 and the outer flat part 24 rests on the cylinder head 4. The inner flat part 23 has a plurality of holes 15 for coolant passages so that the space between the inner flat part 23 and the cylinder head 4 is filled with coolant.

Figure 4:
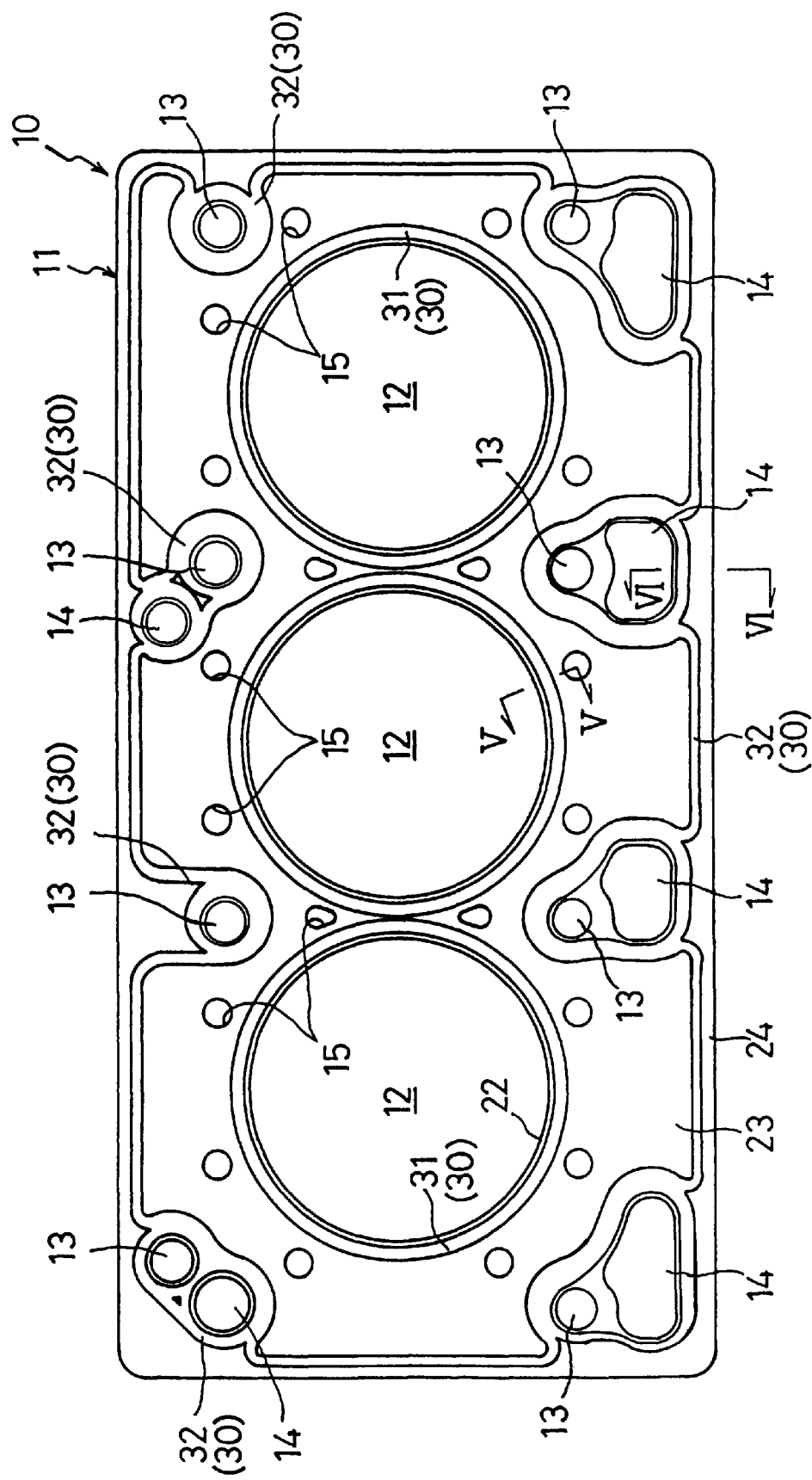
FIG. 4 is a plan view of the metal gasket.
Figure 5:
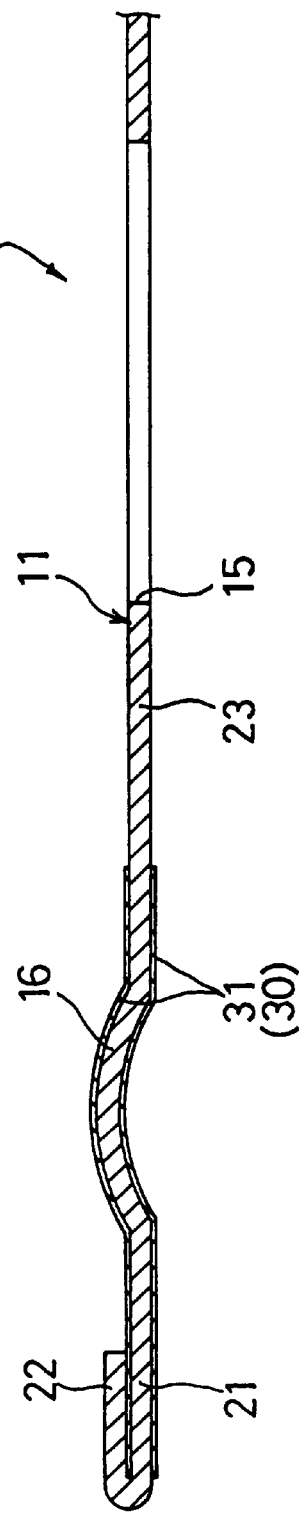
FIG. 5 is a sectional view taken along the line V—V in FIG. 4.
Figure 6:
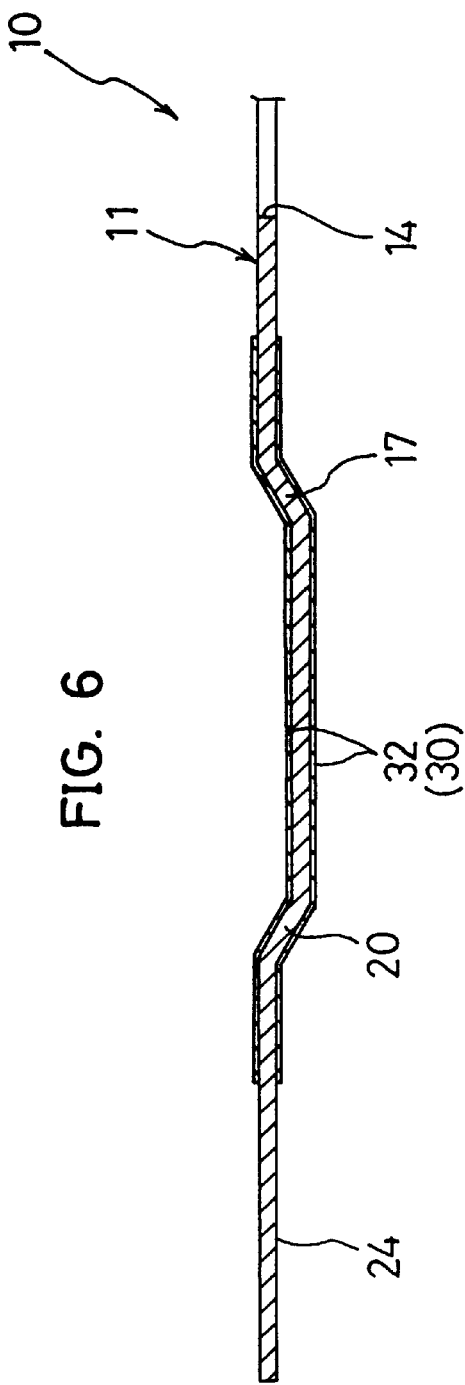
FIG. 6 is a sectional view taken along the line VI—VI in FIG. 4.

The beaded plate 11 has a coating layer 30 which is constructed as follows: As shown in FIGS. 4 to 6, the coating layer 30 is formed on the upper and lower sides of the beaded plate 11 by pattern printing, such that it covers the beads 16–20 and their vicinity. It is not formed on the other parts. The method of pattern printing is by letterpress printing, lithographic printing, intaglio printing, screen printing, flock printing, magnetic printing, hot stamping, or the like, or by spreading by means of a dispenser.

The coating layer 30 formed on the upper and lower sides of the bead 16 is designated as the coating layer 31. It is formed from a coating material which is both heat-resistant and wear-resistant so that it can prevent coolant and hot combustion gas from leaking. The other coating layer 32 is formed from an impervious and wear-resistant coating material so that it can prevent leakage of either lubricant or coolant. Incidentally, the coating layer 32 may be divided into several sections according to its use conditions, and they may be formed from different coating materials. Alternatively, the coating layer 30 may be formed entirely from a single coating material.

The coating material for the coating layers 31, 32 may be selected from synthetic rubbers, plastics, or composite materials thereof. Examples of the synthetic rubbers include fluororubber, NBR, SBR, and silicone rubber. Examples of the plastics include epoxy resin, silicone resin, phenolic resin, polyurethane resin, polyimide resin, polyvinyl chloride resin, acrylic resin, ABS resin, and PTFE (polytetrafluoroethylene) resin. The composite materials are those which are prepared by incorporating any of the synthetic rubbers or plastics with powder of metal (such as aluminum alloy, copper, brass, and stainless steel) or other materials (such as glass powder, glass fiber, ceramic powder, ceramic fiber, and molybdenum sulfide powder). Their selection depends on the conditions under which the metal gasket is used.

The metal gasket 10 of the present invention provides the following functions. The metal gasket 10 is held between the cylinder block 1 and the cylinder head 4 by tightening the eight cylinder head fastening bolts. With the metal gasket 10 installed, a gap corresponding to the thickness of the stopper 22 is formed in the vicinity of the bead 16. The gap prevents the bead 16 from being deformed anomalously when the bolts are tightened.

The bead 16 has the coating layer 31 on its upper and lower surfaces. The bead 16 is pressed against the underside of the cylinder head 4 and the top of the cylinder block 1, so that the combustion chamber 7 is kept gastight. The beads 17 and 19 have the coating layer 32 on their upper and lower surfaces. The beads 17 and 19 are pressed against the underside of the cylinder head 4 and the top of the cylinder block 1, so that the lubricant is water tightly separated from the coolant. The beads 18 and 20 have the coating layer 32 on their upper and lower surfaces. The beads 18 and 20 are pressed against the underside of the cylinder head 4 and the top of the cylinder block 1, so that the coolant is separated from the outside.

Although the coolant enters the gap between the inner flat part 23 and the cylinder head 4, the absence of a coating layer thereon eliminates the possibility of the coating layer peeling off the inner flat part resulting in a deterioration of cooling performance.

The metal gasket 10 of the present invention has the coating layer 30 formed only on those parts where sealing is necessary. This leads to the saving of the coating material and the cost reduction of the metal gasket 10.

In addition, the metal gasket 10 of the present invention has the coating layer 30 formed by pattern printing. This simplifies the production of the metal gasket and facilitates the formation of the coating layer 30.

According to the present invention, the coating layer 30 is formed from different coating materials selected according to the conditions under which the sealed part is used. This greatly contributes to improve the sealing performance of the metal gasket 10.

The construction of the metal gasket 10 may be partialy modified as follows:

(1) The coating layer 30 may be formed such that its thickness increases stepwise or continuously in going away from the bolt hole 13. This modification permits the metal gasket 10 to be pressed under uniform surface pressure against the cylinder head 4 and the cylinder block 1 resulting in improved sealing performance.

(2) The coating layer 30 may be formed such that its width decreases stepwise or continuously in going away from the bolt hole 13. This modification permits the metal gasket 10 to be pressed under uniform surface pressure against the cylinder head 4 and the cylinder block 1. The result is an improved sealing performance.

(3) The coating layer 31 surrounding the combustion chamber may be thicker than other coating layers 32. This modification makes the seal surrounding the combustion chamber more gastight than that surrounding other parts.

Figure 7:
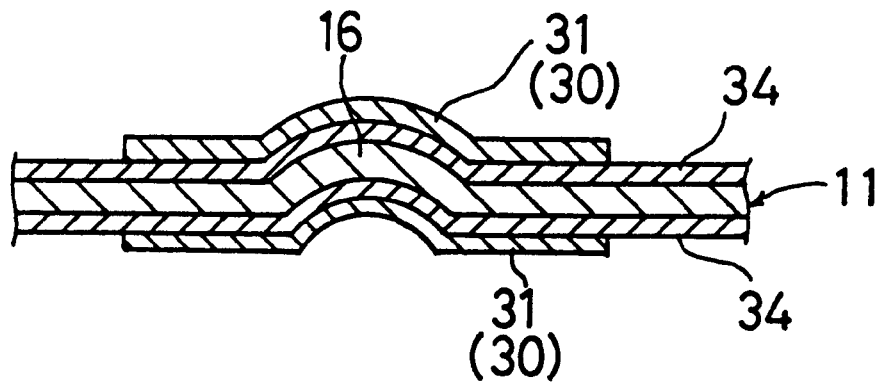
FIG. 7 is a vertical sectional view near the bead of the metal gasket having a different structure.

(4) The beaded plate 11 may have the coating layer 34 formed on its entire surface and the coating layer 34 may have the coating layer 31 formed by pattern printing partly on its surface, as shown in FIG. 7. In this case, the coating layer 32 (not shown) may be formed by pattern printing partly on the surface of the coating layer 34 in the same manner as the coating layer 31 is formed.

Figure 8:
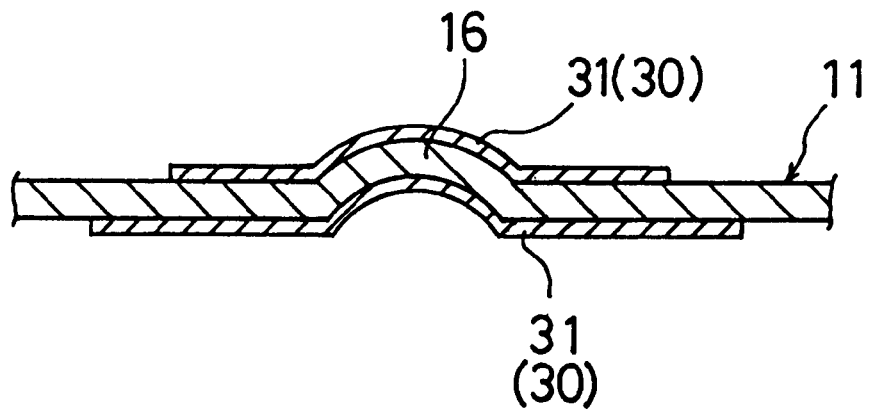
FIG. 8 is a vertical sectional view near the bead of the metal gasket having a different structure.

(5) The beaded plate 11 may have the upper and lower coating layers 31 (differing in width) formed on its both surfaces, as shown in FIG. 8. Incidentally, the upper and lower coating layers 32 (not shown) may be formed, with a different width, on the beaded plate 11 in the same manner as the coating layer 31 is formed.

FIGS. 9–12 show the metal gaskets 40–42 of multiple-plate structure, each consisting of a stiffening plate 44 (having a spacer and a stopper) and a beaded plate 45.

Incidentally, the beaded plate 45 for the metal gaskets 40–42 is identical with the above-mentioned beaded plate 11 except that it lacks the stopper 22; therefore, it is given the same reference numerals for the same parts of the beaded plate 11. The stiffening plate 44 is a thin flat metal plate, which, like the beaded plate 11, has three openings, eight holes for bolts, six holes for lubricant passages, and a plurality of holes for coolant passages. In addition, it has on the periphery of its opening a stopper 46 formed by folding back.

Figure 9:
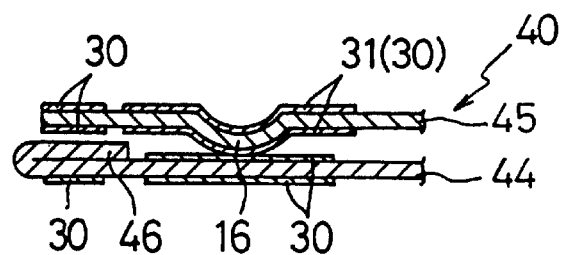
FIG. 9 is a vertical sectional view of the metal having a double-plate structure.

The metal gasket 40 shown in FIG. 9 is of double-plate structure composed of the beaded plate 45 and the stiffening plate 44 placed on the underside thereof. It is characterized in that the beaded plate 45 has the bead 16 formed convex toward the stiffening plate 44 and the stiffening plate 44 has its end 46 folded back toward the beaded plate 45. The beaded plate 45 has the coating layer 30 formed on the region as shown. Although not shown, the coating layer 30 is also formed on that region of both sides of the beaded plate 45 and the stiffening plate 44 which coincides with each of the beads 17–20.

Figure 10:
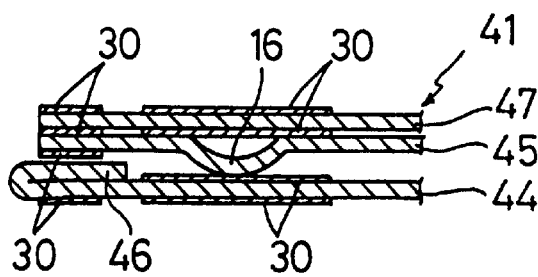
FIG. 10 is a vertical sectional view of the metal gasket having a first triple-plate structure.

The metal gasket 41 shown in FIG. 10 has a triple-plate structure composed of the beaded plate 45 and the upper and lower stiffening plates 47, 44 placed on both sides thereof. The lower stiffening plate 44 has the stopper 46, whereas the upper stiffening plate 47 has no stopper. The beaded plate 45 has the bead 16 formed convex toward the stiffening plate 44, and the stiffening plate 44 has the stopper 46 folded back toward the beaded plate 45. The coating layer 30 is formed on the region as shown. Although not shown, the coating layer 30 is also formed on that region of both upper and lower sides of the stiffening plate 44 which coincides with each of the beads 17–20.

Figure 11:
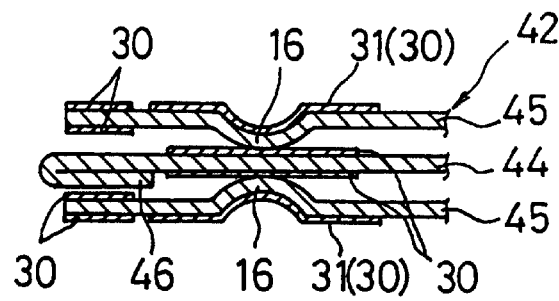
FIG. 11 is a vertical sectional view of the metal gasket having a second triple-plate structure.
Figure 12:
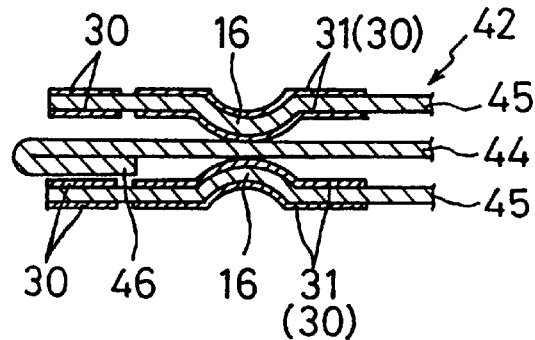
FIG. 12 is a vertical sectional view of an important part of the metal gasket having a third triple-plate structure.

The metal gasket 42 shown in FIG. 11 has a triple-plate structure composed of the upper and lower beaded plates 45 and the stiffening plate 44 sandwiched between them. Each of the beaded plated 45 has the bead 16 formed convex toward the stiffening plate 44. The stiffening plate 44 has the stopper 46 folded back downward. The coating layer 30 is formed on the region as shown. Although not shown, the coating layer 30 is also formed on that region of both upper and lower sides of the stiffening plate 44, the top of the upper beaded plate 45, and the underside of the lower beaded plate 45, which coincides with each of the beads 17–20. In the case of this metal gasket 42, the coating layer 30 may also be formed in the region shown in FIG. 12. In such a case, although not shown, the coating layer 30 is formed on that region of the upper and lower sides of the upper and lower beaded plates 45, which coincides with each of the beads 17–20.

Incidentally, in the case of the metal gaskets 40–42, too, it is possible to alter the width and thickness of the coating layer 30 as in the case of the metal gasket 10. The pattern of the coating layer 30 is not limited to that shown; it may be changed according to use conditions. Moreover, the relative position of the beaded plate 45 and the stiffening plates 44, 47 is riot limited to that shown; it may be changed as required. The principle of the present invention may be applied to metal gaskets composed of four or more plates.

The above-mentioned stoppers 22, 46 may be partly modified in structure as explained below, in which the same reference numerals designate corresponding parts to avoid repeated explanation.

Figure 13:
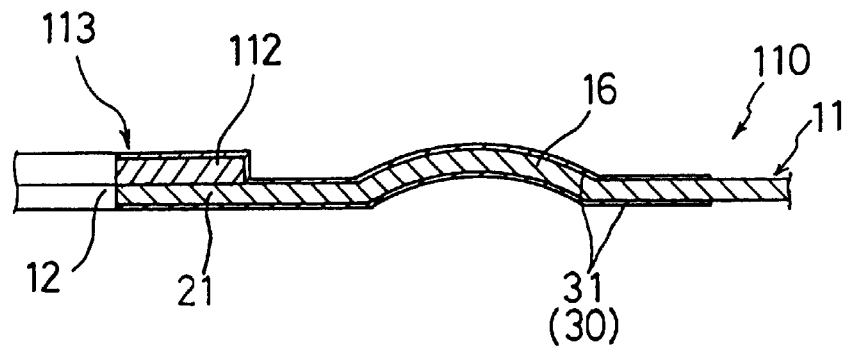
FIG. 13 is equivalent to FIG. 5, showing a first modification of the stopper.

The metal gasket 110 shown in FIG. 13 differs from the metal gasket 10 in that it lacks the stopper 22. It has the coating layer 112 formed (from the same coating material as mentioned above) by pattern printing on the upper surface of the flat rim 21 of the inner periphery of the beaded plate 11. This coating layer 112 functions as the stopper 113 to regulate the anomalous displacement of the bead 16. Incidentally, the thickness of the stopper 113 is slightly less than the height of the bead 16. The surfaces of the bead 16 and the stopper 113 are covered with the coating layer 31.

Since this metal gasket 110 has its stopper 113 formed by pattern printing, the beaded plate 11 can be produced by a greatly simplified process.

If the stopper 113 is formed from a comparatively soft plastics, it is possible to prevent the coating layer 31 from peeling off from it. Even if peeling should occur, the stopper 113 provides a sufficient seal.

The metal gasket 110 may be modified as explained below.

Figure 14:
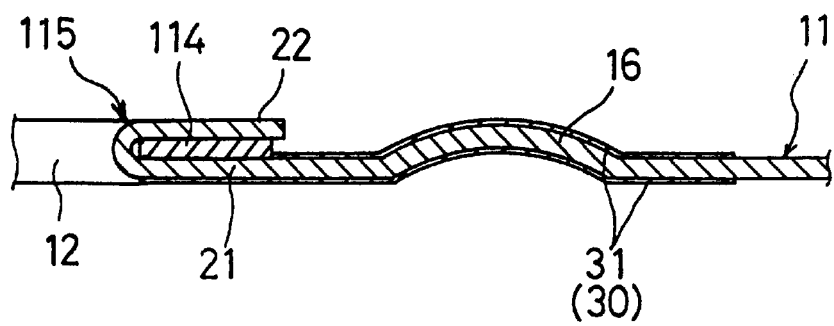
FIG. 14 is equivalent to FIG. 5, showing a second modification of the stopper.
Figure 15:
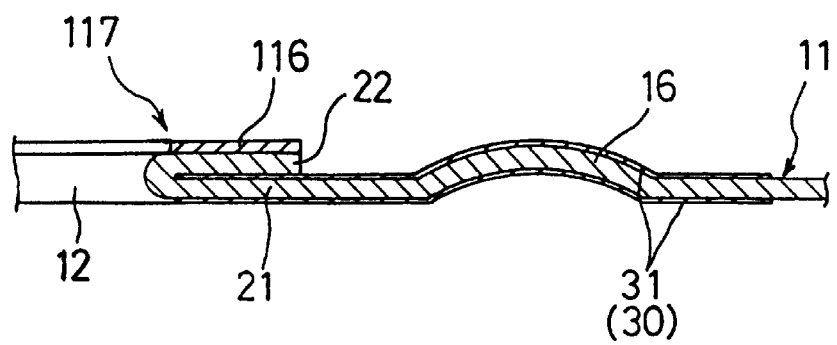
FIG. 15 is equivalent to FIG. 5, showing a third modification of the stopper.

(1) The metal gasket may have the stopper 22 as shown in FIG. 14. In this case the coating layer 114 may be formed from the above-mentioned coating material between the stopper 22 and the flat rim 21 of the inner periphery. (In other words, the stopper 22 and the coating layer 114 constitute the stopper 115.) Alternatively, the coating layer 116 may be formed on the top of the stopper 22, so that the stopper 22 and the coating layer 116 constitute the stopper 117, as shown in FIG. 15.

Figure 16:
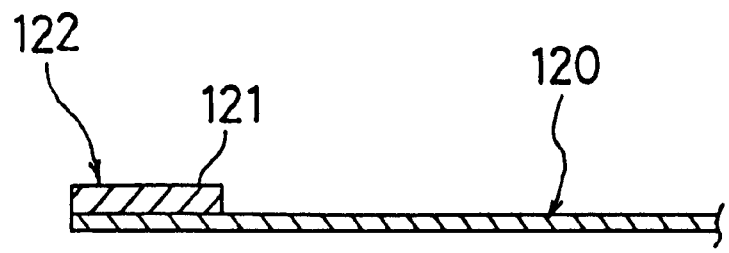
FIG. 16 is equivalent to FIG. 5, showing a fourth modification of the stopper.
Figure 17:
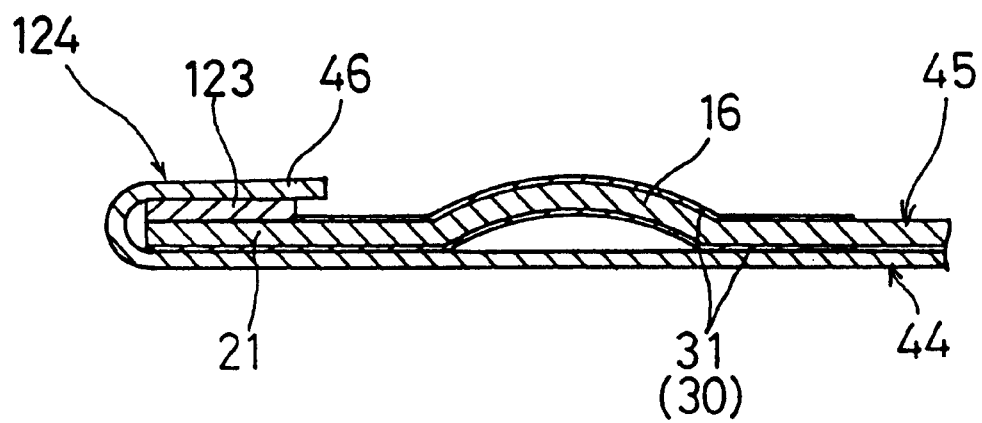
FIG. 17 is equivalent to FIG. 5, showing an example of the stopper of a laminated metal gasket.

(2) In the case of the metal gaskets 40–42 of laminated structure, the stiffening plate 44 may be replaced by the one 120 which lacks the stopper 46. Instead, the stopper 46 is covered with the coating layer 121 formed from the above-mentioned coating material so that the coating layer 121 functions as the stopper 122, as shown in FIG. 16. Furthermore, the stiffening plate 44 may be provided with the stopper 46 which wraps the periphery of the opening of the beaded plate 45, as shown in FIG. 17. In this case the coating layer 123 may be formed between the stopper 46 and the beaded plated 45 so that the stopper 46 and the coating layer 123 form the stopper 124.

Figure 18:
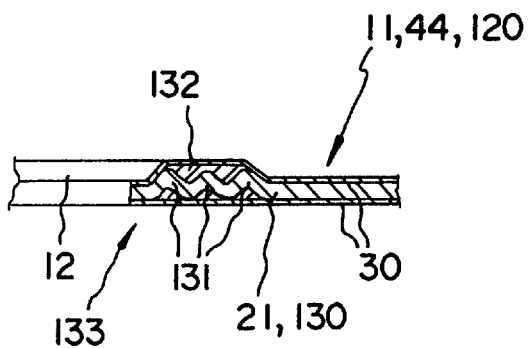
FIG. 18 is equivalent to FIG. 5, showing a fifth modification of the stopper.
Figure 19:
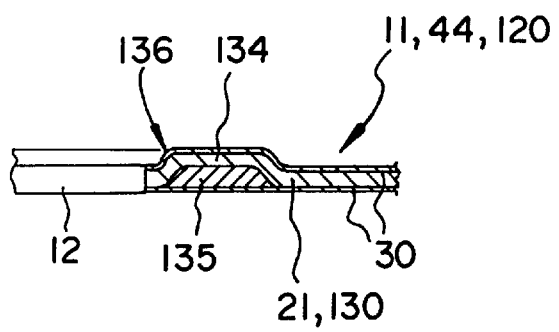
FIG. 19 is equivalent to FIG. 5, showing a sixth modification of the stopper.
Figure 20:
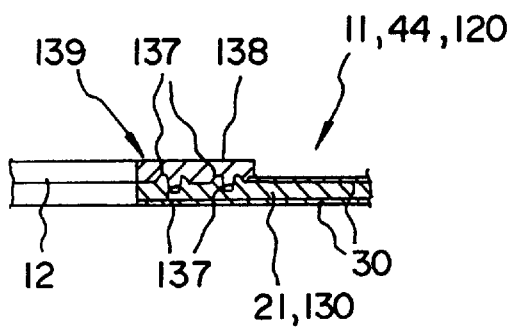
FIG. 20 is equivalent to FIG. 5, showing a seventh modification of the stopper.

(3) The above-mentioned stopper may also be formed as shown in FIGS. 18 to 20.

In FIG. 18 there are shown a plurality of secondary beads 131 which are formed concentric with the opening 12 on the flat rim 21 of the beaded plate 11 or on the flat part 130 of the stiffening plate 44, 120 which corresponds to the flat rim 21. The coating layer 132 is formed from the above-mentioned coating material such that it covers the secondary beads 131. Thus, the secondary beads 131 and the coating layer 132 constitute the stopper 133.

In FIG. 19 there is shown one secondary bead 134 which is formed on the flat rim 21 of the inner periphery of the beaded plate 11 or on the flat part 130 of the stiffening plate 44, 120. On the underside of the secondary bead 134 is formed the coating layer 135 from the above-mentioned coating material, so that the secondary bead 134 and the coating layer 135 constitute the stopper 136.

In FIG. 20 there are shown a plurality of irregularities 137 which are formed on the flat rim 21 of the inner periphery of the beaded plate 11 or on the flat part 130 of the stiffening plate 44, 120. The irregularities 137 are covered by the coating layer 138 formed from the above-mentioned coating material, so that the irregularities 137 and the coating layer 138 constitute the stopper 139.

Figure 21:
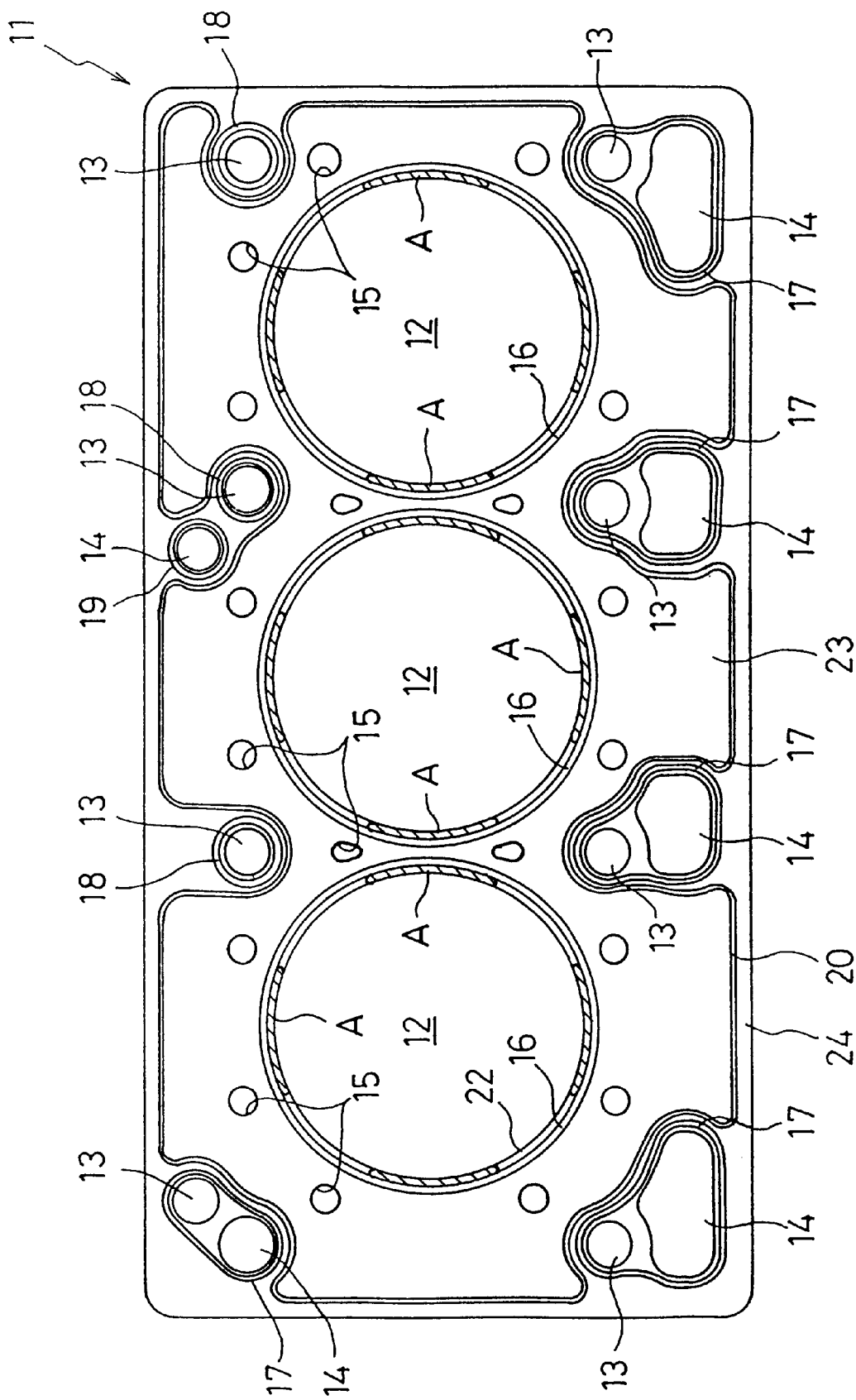
FIG. 21 is a schematic diagram showing the positions where the coating layers are formed.

(4) The above-mentioned stopper may be formed such that its thickness and width smoothly decrease in approaching the bolt hole 13 or its width increases in approaching the bolt hole 13. Alternatively, the stopper may be formed only in the area A (hatched in FIG. 21) which is away from the bolt hole 13. In this case, the surface pressure of the cylinder block 1 at the part corresponding to the stopper is made uniform throughout the entire periphery of the opening of the cylinder hole 2. This contributes to the roundness of the cylinder hole 2 near the top dead center. In addition, this provides a sufficient seal between the cylinder hole 2 (near the top dead center) and the piston ring 6, thereby improving the engine performance and decreasing the consumption of lubricant.

Figure 22A:
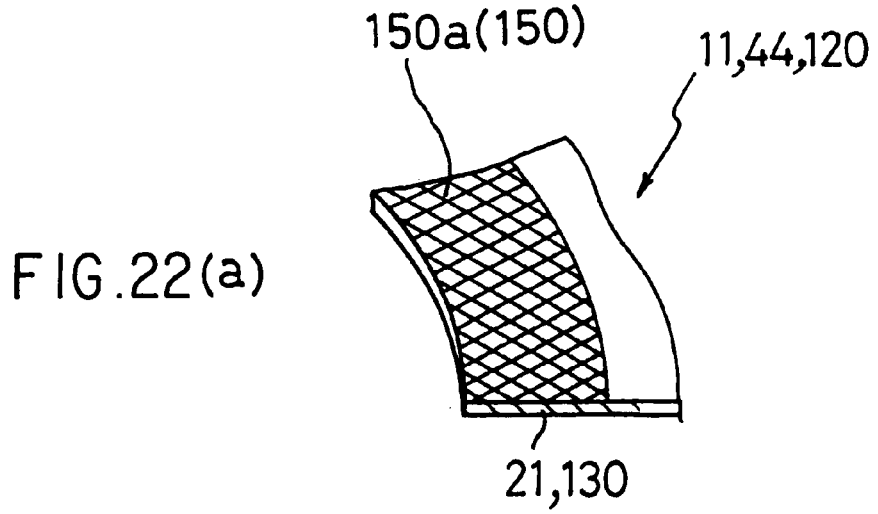
FIG. 22 is a perspective view showing the beaded plate or stiffening plate having a roughened surface.
Figure 22B:
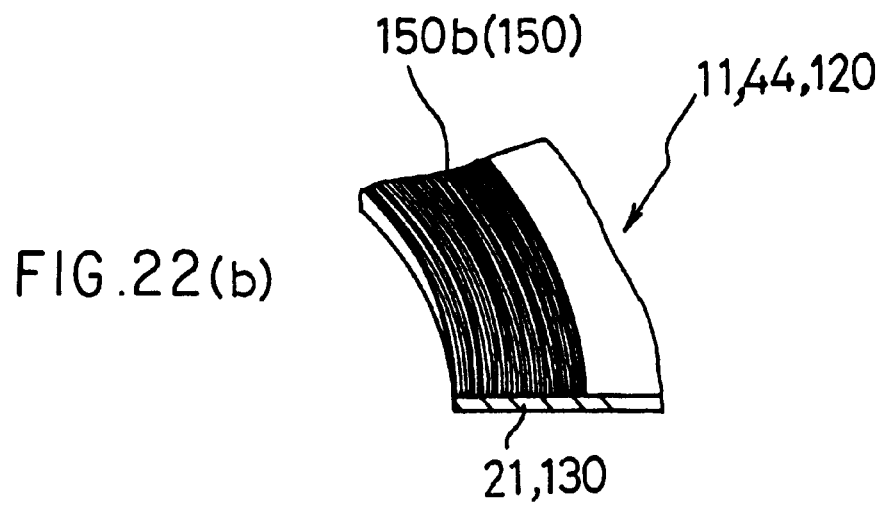
Figure 22C:
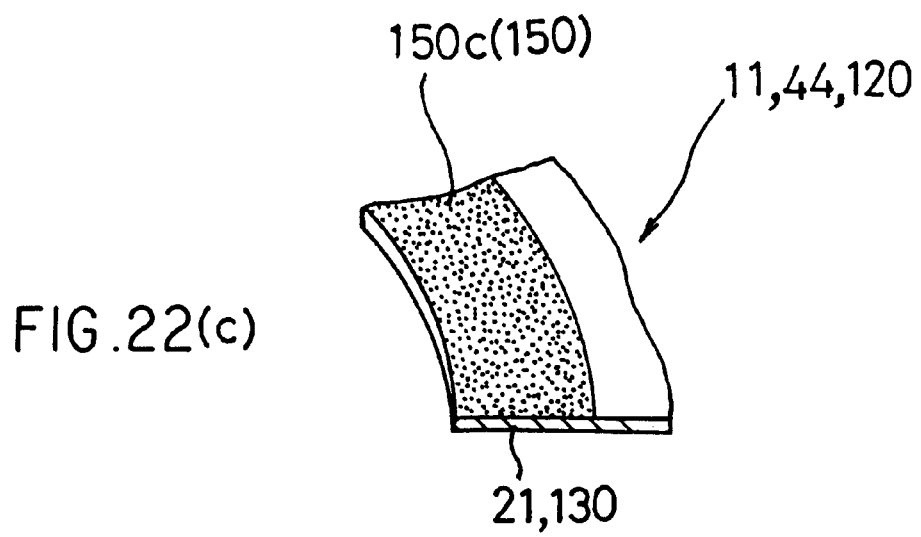

(5) The above-mentioned flat rim 21, 130 may be provided with a rough surface 150 which is formed by machining or chemical treatment before it is covered with the coating layer, as shown in FIG. 22. This rough surface 150 may be in the form of machined knurl 150*a*, as shown in (a), machined concentric grooves 150*b*, as shown in (b), or chemically etched fine irregularities 150*c*, as shown in (c).

In Example 1, the present invention was applied to the metal gaskets 10, 40–42 to be placed between the cylinder block 1 and the cylinder head 4 of a V-6 engine. The present invention may also be applied to metal gasket for other engines such as V-type multiple-cylinder engines, single-cylinder engines, and straight multiple-cylinder engines. It may also be applied to the metal gasket for any compressor and air pump having the cylinder block 1 and the cylinder head 4.

EXAMPLE 2

This example demonstrates the metal gasket of the present invention which is placed between the cylinder head 4 and the intake manifold of a V-6 engine.

Figure 23:
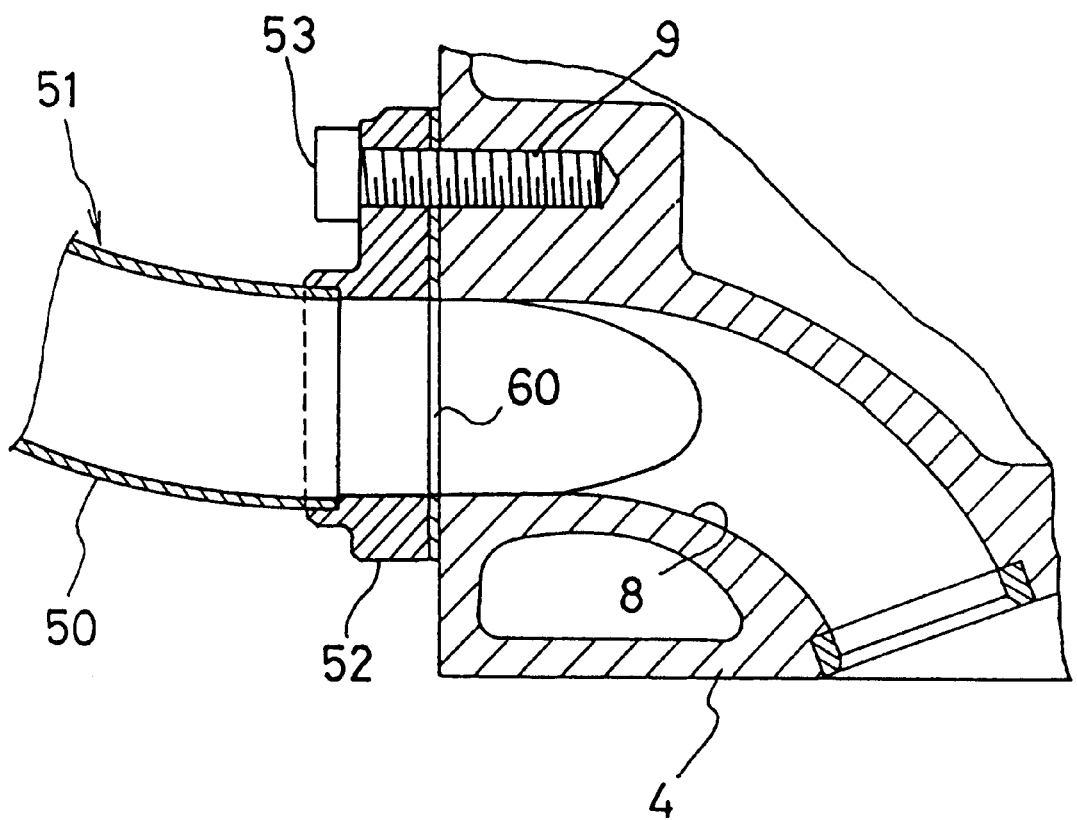
FIG. 23 is a vertical sectional view showing a portion of the cylinder head and intake manifold.

As shown in FIGS. 1 and 23, the V-6 engine has cylinder heads 4 on the respective right and left banks 1A, 1B. The cylinder head 4 has in its wall three intake ports 8, seven bolt tightening holes 9, and holes for EGR (exhaust gas recirculation) passages and coolant passages (not shown).

The cylinder head 4 has the intake manifold 51 fixed thereto. (The intake manifold 51 has three intake branches 50 communicating with the respective three intake ports 8.) At the downstream end of the intake manifold 51 is installed the flange 52. Between the flange 52 and the side wall of the cylinder head 4 is installed the metal gasket 60 which permits the three intake branches 50 to be connected gastight to the three intake ports 8, respectively. The metal gasket 60 is fixed, together with the intake manifold 51, to the cylinder head 4 by seven bolts 53.

Figure 24:
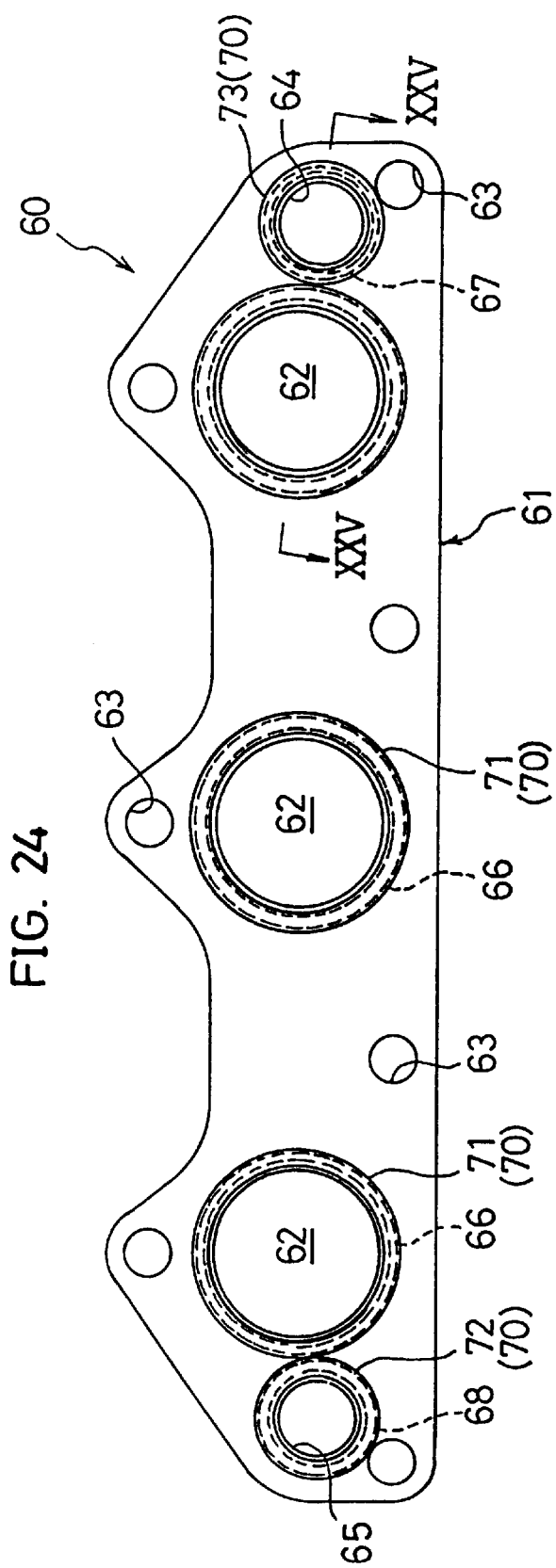
FIG. 24 is a front view of the metal gasket for the intake manifold.
Figure 25:
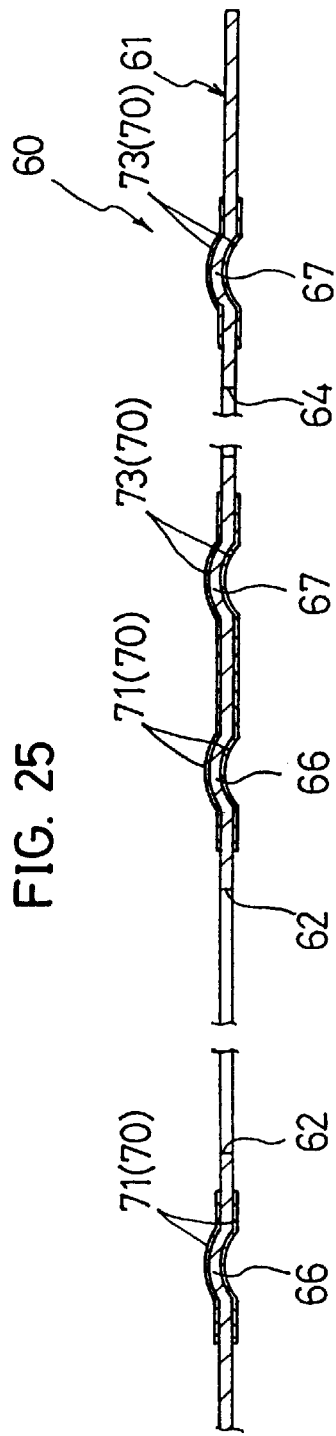
FIG. 25 is a sectional view taken along the line XXV—XXV in FIG. 22.

The metal gasket 60 is composed of the beaded plate 61 of elastic metal on which the coating layer 70 is formed, as shown in FIGS. 24 and 25. The beaded plate 61 has almost the same shape as the mating surface between the flange 52 and the cylinder head 4. The beaded plate 61 has three openings 62 (for the three intake ports 8), seven holes 63 (for the seven bolt tightening holes 9), one hole 64 (for the EGR passage), and one hole 65 (for the coolant passage). In addition, the beaded plate 61 has the bead 66 surrounding the opening 62, the bead 67 surrounding the hole 64 for the EGR passage, and the bead 68 surrounding the hole 65 for the coolant passage.

As shown in FIGS. 24 and 25, the beaded plate 61 has the coating layer 70 which is formed on both sides and in the vicinity of the beads 66–68 by pattern printing as in Example 1. The coating layer 71 on both sides of the bead 66 is formed from a coating material superior in fuel resistance, oil resistance, and wear resistance, so that it provides a good seal for the gas containing fuel and blow-by oil The coating layer 72 on both sides of the bead 67 is formed from a coating material superior in heat resistance, gastightness, and wear resistance, thereby providing a good seal for the high-temperature EGR oil. The coating layer 73 on both sides of the bead 68 is formed from a coating material superior in heat resistance, watertightness, and wear resistance. The coating material may also include those mentioned in Example 1.

The metal gasket 60 for the intake manifold 51 produces the same effect as that in Example 1. In addition, the metal gasket 60 may be modified as in Example 1 such that the thickness and width of the coating layer 70 are changed in conformity with the part to be sealed.

In Example 2, the present invention was applied to the metal gaskets 60 of single-plate structure to be placed between the cylinder head 4 and the intake manifold 51 of a V-6 engine. The present invention may also be applied to the metal gasket of single-plate structure or multiple-plate structure for other engines such as V-type multiple-cylinder engines, single-cylinder engines, and straight multiple-cylinder engines. It may also be applied to the metal gasket to be placed between the cylinder head 4 and the exhaust manifold.

EXAMPLE 3

In this example, the present invention is applied to the separate plate for the control valve unit of an automotive automatic transmission.

Figure 26:
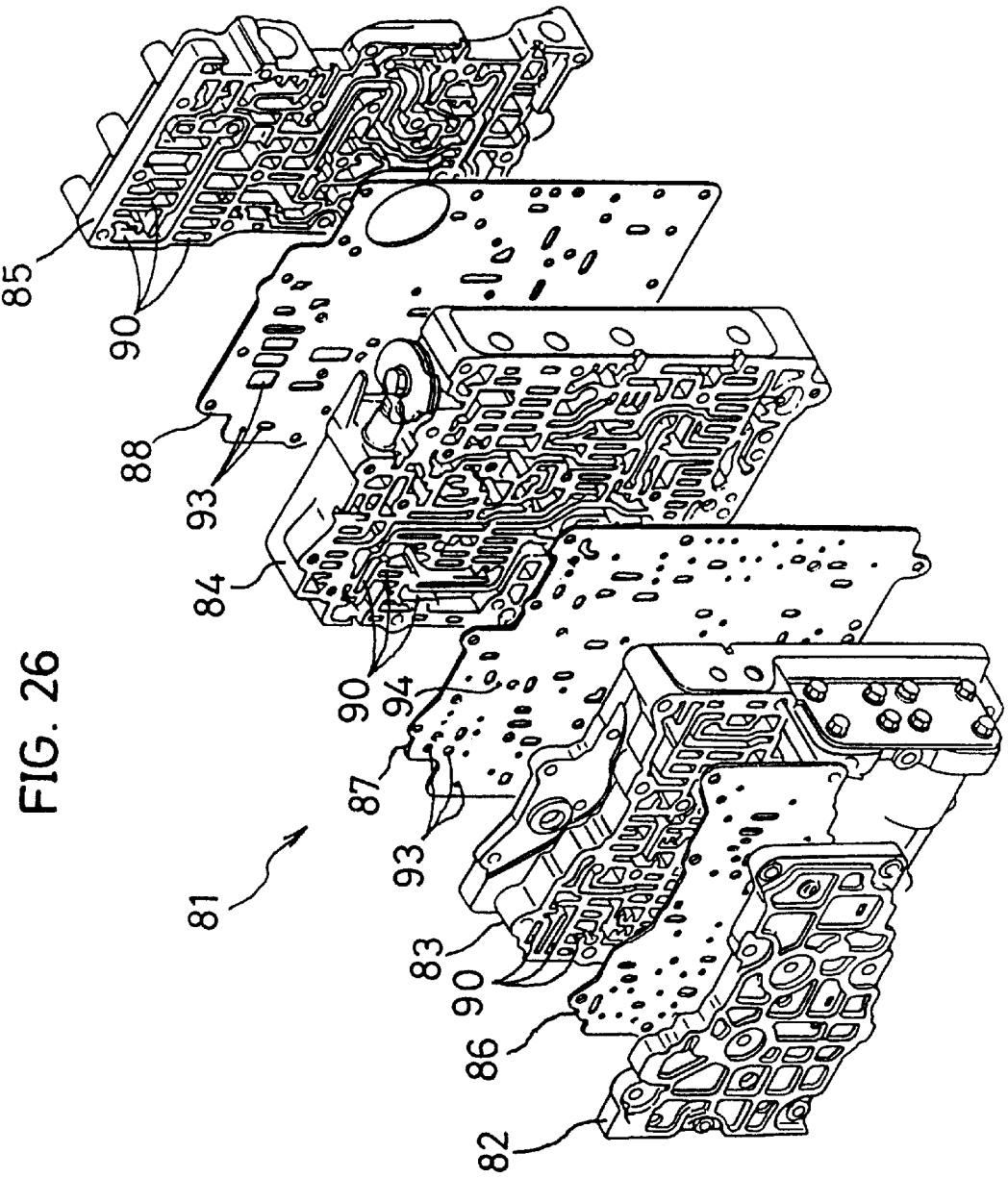
FIG. 26 is an exploded perspective view of the control valve unit.

As shown in FIG. 26, the control valve unit 81 is made up of four sections 82–85, which are the front valve body 82, the premain valve body 83, the main valve body 84, and the rear valve body 85. The separate plates 86–88 (equivalent to the metal gaskets) are placed respectively between the valve bodies 82 and 83, between the valve bodies 83 and 84, and between the valve bodies 84 and 85.

Figure 27:
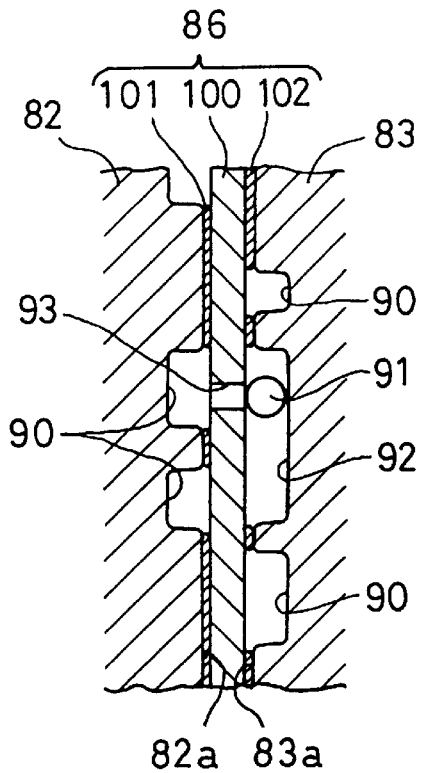
FIG. 27 is a vertical sectional view showing a portion of the control valve unit.
Figure 28:
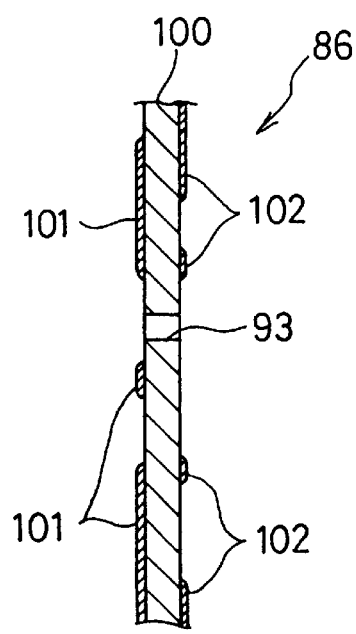
FIG. 28 is a vertical sectional view showing a portion of the separate plate.
Figure 29:
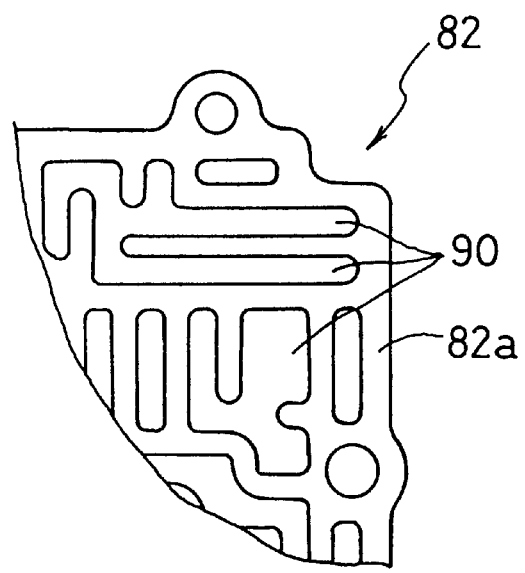
FIG. 29 is an end view showing a portion of the front valve body as viewed from the separate plate side.
Figure 30:
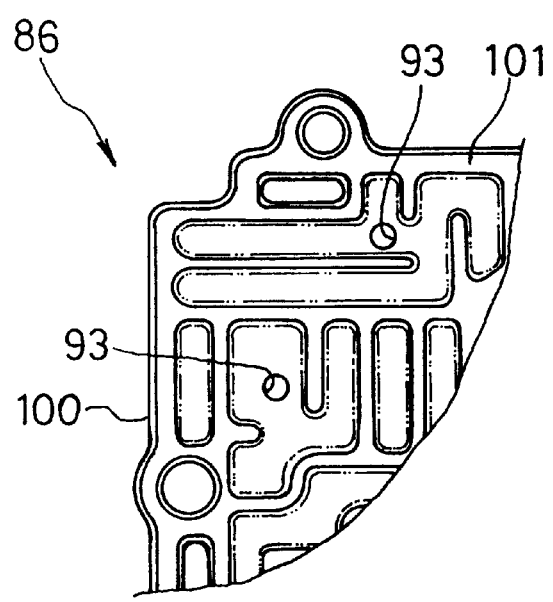
FIG. 30 is an end view showing a portion of the separate plate as viewed from the front valve body side.
Figure 31:
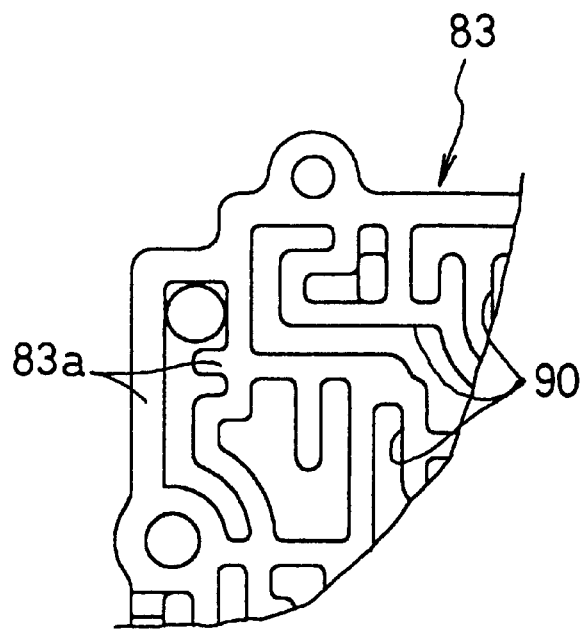
FIG. 31 is an end view showing a portion of the premain valve body as viewed from the front valve body side.
Figure 32:
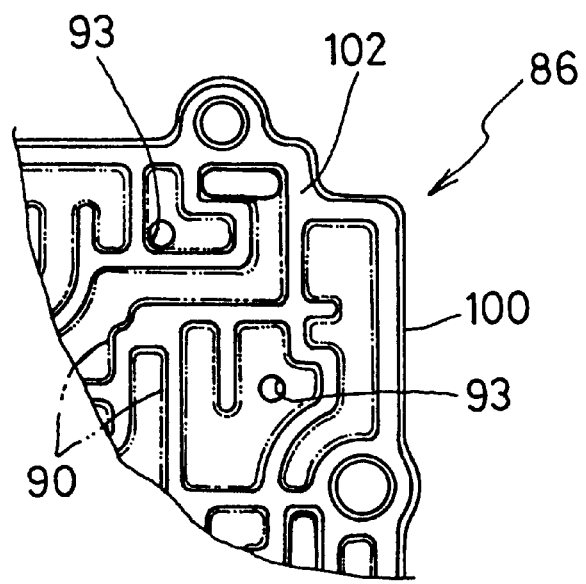
FIG. 32 is an end view showing an important part of the separate plate as viewed from the premain valve body side.

On one end face of each of the valve bodies 82, 85 and on both end faces of each of the valve bodies 83, 84 are cut the oil grooves 90 and the groove 92 to accommodate check balls 91, as shown in FIG. 27. Each of the separate plates 86–88 is installed oiltight on each of the mating surfaces of the valve bodies 82–85 so that the hydraulic circuit is formed through the valve bodies 82–85 connected by the separate plates 86–88. Each of the separate plates 86–88 has a plurality of oil holes 93 and orifices 94 (arranged according to a prescribed pattern) that permit the passage of the oil grooves 90 of the adjoining valve bodies 82–85. FIG. 26 does not show the coating layers 101, 102 to be explained later.

The separate plates 86–88 are constructed as explained below so that an oiltight seal is produced between the separate plates 86–88 and the valve bodies 82–85. Since the separate plates 86–88 are basically of the same structure, the following explanation is limited to the separate plate 86 placed between the front valve body 82 and the premain valve body 83.

As shown in FIGS. 27–32, the separate plate 86 is composed of a flat substrate 100, which has the coating layers 101, 102 formed on both sides of the edge thereof. The coating layers 101, 102 are formed by pattern printing on the respective mating surfaces 82a, 83a of the valve bodies 82, 83. The thickness of the coating layers 101, 102 should be greater than 5/1000 mm, preferably from 1/100 to 5/100 mm. The coating layers 101, 102 are formed within the area corresponding to the mating surfaces 82a, 83a of the valve bodies 82, 83 so that they are not exposed to the oil grooves 90 and the groove 92 when the separate plate 86 is placed between the valve bodies 82, 83. The width of the coating layers 101, 102 is not specifically limited. It may be gradually reduced in approaching the bolt tightening part, or it may be narrow throughout.

The substrate 100 may be a plate of metal material (such as stainless steel and aluminum alloy) or nonmetallic material (such as plastic). It should preferably be a steel plate, which has sufficient strength and stiffness and is inexpensive and yet does not require any anticorrosive treatment when it is used in the hydraulic circuit. As in Example 1, the pattern printing for the coating layers 101, 102 may be accomplished by letterpress printing, lithographic printing, intaglio printing, screen printing, flock printing, magnetic printing, hot stamping, or the like, or by spreading by means of a dispenser. Of these printing methods, intaglio printing and screen printing are desirable because they are efficient and provide a sufficient coating thickness. The pattern printing may use any ink selected from the coating materials mentioned in Example 1.

The substrate 100 undergoes pattern printing for the coating layers 101, 102 after degreasing. To improve the adhesion of the coating layers 101, 102 to the substrate 100, the substrate 100 may be given, prior to degreasing, surface irregularities by sand blasting or chemical treatment. For the improved adhesion, the substrate 100 (both sides) may be coated with an adhesive prior to pattern printing.

The separate plates 86–88 produce the following effect. The separate plates 87, 88 have the coating layer corresponding to the coating layers 101, 102. The control valve unit 81 is completed by tightening together the valve bodies 82–85 by bolts (not shown), with the separate plates 86–88 installed respectively between them. Since the separate plates 86–88 have the coating layers integrally formed thereon, they greatly simplify the assembling of the control valve unit 81.

The coating layers 101, 102 may be formed by pattern printing regardless of how complicated their pattern may be. Thus it is possible to design the coating layers 101, 102 such that they are not exposed to the oil grooves 90 and the groove 92. This minimizes the area through which the coating layers 101, 102 come into contact with the hydraulic fluid, with the result that the coating layers 101, 102 are protected from deterioration. Moreover, it makes possible to form the coating layer 101, 102 by avoiding the part where the check ball 91 is mounted or the orifice 94 is formed. This certainly prevents the hydraulic fluid from entering in case the coating layers 101, 102 should break or wear.

It is possible to form the coating layers 101, 102 of different pattern on the substrate 100 by simply replacing the printing plate. This permits one to easily cope with the design change of the control valve unit 81.

In Examples 1 to 3 mentioned above, the present invention was applied to the metal gaskets 10, 40–42 to be placed between the cylinder block 1 and the cylinder head 4, the metal gasket 60 to be placed between the cylinder head 4 and the intake manifold 51, and the separate plates 86–88 to be placed between the control valve units 81 of an automatic transmission. It is also possible to apply the present invention to any metal gasket to be placed between two members of any other machines.

The metal gasket of the present invention has the coating layer formed thereon by pattern printing. The pattern printing makes it possible to form the coating layer only on the part which needs a seal. This minimizes the amount of the coating material while keeping a sufficient seal, which leads to a lower production cost. The pattern printing forms the coating layer only on the part which needs it. This eliminates the step of removing unnecessary coating layers, which contributes to higher productivity and simplifies the production line. Furthermore, the pattern printing makes it possible to easily form the coating layer no matter how complicated its pattern may be. This permits the coating layer to be formed easily on the engine head gasket having a plurality of holes for the combustion chamber, lubricant passages, coolant passages, and bolt holes.

The coating layer may be formed such that its characteristics vary in conformity with the sealing part. This contributes to the sealing performance and durability of the metal gasket.

That is, the coating layer may be formed from different materials selected in accordance with heat resistance and wear resistance required of the individual seal part. The resulting metal gasket has improved sealing performance and durability.

The coating layer may vary in thickness in conformity with the seal part. The coating layer with a reduced thickness provides a reduced surface pressure, whereas the coating layer with an increased thickness provides an increased surface pressure. This permits the surface pressure of the metal gasket to be properly adjusted to improve its sealing performance. For example, the coating layer may be reduced in thickness stepwise or continuously in going to the part where two members are tightened by bolts. This makes uniform the surface pressure of the metal gasket and hence improves the sealing performance of the metal gasket. Similarly, the coating layer may be partly increased in thickness at the part where a high surface pressure is necessary. This greatly increases the sealing performance at that part.

Moreover, the coating layer may increase in width in conformity with the sealing part. The surface pressure will be low at the wider part and high at the narrower part. This adjusts the surface pressure of the metal gasket to improve its sealing performance, as in the case of increasing the width of the coating layer.

The coating layer can be used as a spacer to keep constant the gap between two members. It prevents the bead from being anomalously deformed when the gasket is used for the cylinder head of an engine.

What is claimed is:

1. A metal gasket comprising a single-plate structure having a flat surface for placement between two base members to be sealed, said flat surface having a printed pattern coating layer formed on a portion of said flat surface to be sealed, said coating layer being spaced from fluid passages in said metal gasket for transporting fluid between said base members without substantial contact of said coating layer with said fluid, wherein said coating layer includes at least two different types of coatings.

2. A metal gasket as defined in claim 1, wherein at least one of the properties of heat resistance, wear resistance, hardness and water resistance of said coating layer conforms with said base member to be sealed.

3. A metal gasket as defined in claim 1, wherein said coating layer has a thickness which varies to conform to radial pressure exerted by said fluid on said base member to be sealed and conforms to pressure exerted by said two base members.

4. A metal gasket as defined in claim 3, wherein said coating layer has a thickness which decreases in approaching a part at which said two base members are bolted together.

5. A metal gasket as defined in claim 3, wherein the thickness of said coating layer increases at a section of said gasket for receiving a high surface pressure than at another section of said gasket.

6. A metal gasket as defined in claim 1, wherein said coating layer has a width of which conforms to the width of said base member to be sealed.

7. A metal gasket as defined in any of claims 1–6, wherein said metal gasket consists of a separate plate for a control valve unit of an automotive automatic transmission.

\* \* \* \* \*